(12) United States Patent
Nicholson et al.

(10) Patent No.: US 11,996,658 B1
(45) Date of Patent: May 28, 2024

(54) SYSTEMS AND METHODS FOR PROVIDING INPUT POWER TO A POWER DISTRIBUTION UNIT

(71) Applicant: Legrand DPC, LLC, West Hartford, CT (US)

(72) Inventors: Calvin Nicholson, Reno, NV (US); Christian Krause, Zwickau (DE); Stefan Oebser, Zwickau (DE); Swen Anderson, Limbach-Oberfrohna (DE); Thomas Hsueh, Taipei (TW); Vimal Bhakta, Reno, NV (US)

(73) Assignee: LEGRAND DPC, LLC, West Hartford, CT (US)

( * ) Notice: Subject to any disclaimer, the term of this patent is extended or adjusted under 35 U.S.C. 154(b) by 0 days.

(21) Appl. No.: 18/351,764

(22) Filed: Jul. 13, 2023

(51) Int. Cl.
*H01R 13/66* (2006.01)
*H01R 25/00* (2006.01)

(52) U.S. Cl.
CPC ......... *H01R 13/665* (2013.01); *H01R 25/003* (2013.01)

(58) Field of Classification Search
CPC ...... H01R 31/02; H01R 31/00; H01R 25/003; H01R 25/006
USPC .................................. 439/620.21, 652, 653
See application file for complete search history.

(56) References Cited

U.S. PATENT DOCUMENTS

| | | | | |
|---|---|---|---|---|
| 4,659,161 A * | 4/1987 | Holcomb | ............... | H01R 31/02 439/652 |
| 5,615,344 A * | 3/1997 | Corder | ................. | G06F 9/4415 710/100 |
| 5,658,158 A * | 8/1997 | Milan | ..................... | H01R 31/02 439/639 |
| 7,497,740 B2 * | 3/2009 | Mei | ....................... | H01R 25/003 439/651 |
| 8,376,782 B2 * | 2/2013 | Govekar | .............. | H01R 25/006 439/502 |
| 8,427,007 B2 * | 4/2013 | Jansma | ................ | H01R 13/514 307/19 |
| 8,447,434 B1 * | 5/2013 | Harris | ....................... | H02J 3/36 700/20 |
| 8,797,174 B2 * | 8/2014 | Chen | .................... | H01R 25/003 439/535 |
| 11,095,081 B2 * | 8/2021 | Irons | .................... | H01R 25/165 |
| 11,126,991 B2 * | 9/2021 | Schneider | .......... | G06Q 30/0635 |
| 2007/0141894 A1 * | 6/2007 | McGinley | ......... | H04M 1/72409 439/447 |
| 2007/0164704 A1 * | 7/2007 | McGinley | .......... | H01R 13/6658 320/114 |

(Continued)

*Primary Examiner* — Gary F Paumen
(74) *Attorney, Agent, or Firm* — Maynard Nexsen PC; Michael Henson

(57) ABSTRACT

A power distribution unit (PDU), including: a housing; one or more outlets; a power input connector; a controller; multiple power input conductors coupled to the power input connector; a pair of conductors coupled to and extending between the power input connector and the controller; and a detachable power cord, including: a power cord connector mateable with the power input connector; multiple power cord conductors coupled to the power cord connector and in electrical communication with corresponding power input conductors; and a memory coupled to the power cord connector and in electrical communication with the pair of conductors, wherein the memory includes information pertaining to the power cord.

21 Claims, 6 Drawing Sheets

(56) References Cited

U.S. PATENT DOCUMENTS

| | | | |
|---|---|---|---|
| 2009/0195970 A1* | 8/2009 | Lee | H01R 13/713 |
| | | | 361/601 |
| 2013/0058012 A1* | 3/2013 | Ballard | H02G 3/18 |
| | | | 361/622 |
| 2014/0183977 A1* | 7/2014 | Braunstein | H02G 3/00 |
| | | | 307/147 |
| 2015/0236459 A1* | 8/2015 | Lee | H01R 25/003 |
| | | | 439/652 |
| 2016/0062939 A1* | 3/2016 | Smith | G06F 13/409 |
| | | | 710/301 |
| 2020/0005560 A1* | 1/2020 | Forkes | G05B 19/05 |
| 2022/0410728 A1* | 12/2022 | Marquez | B60L 8/003 |

* cited by examiner

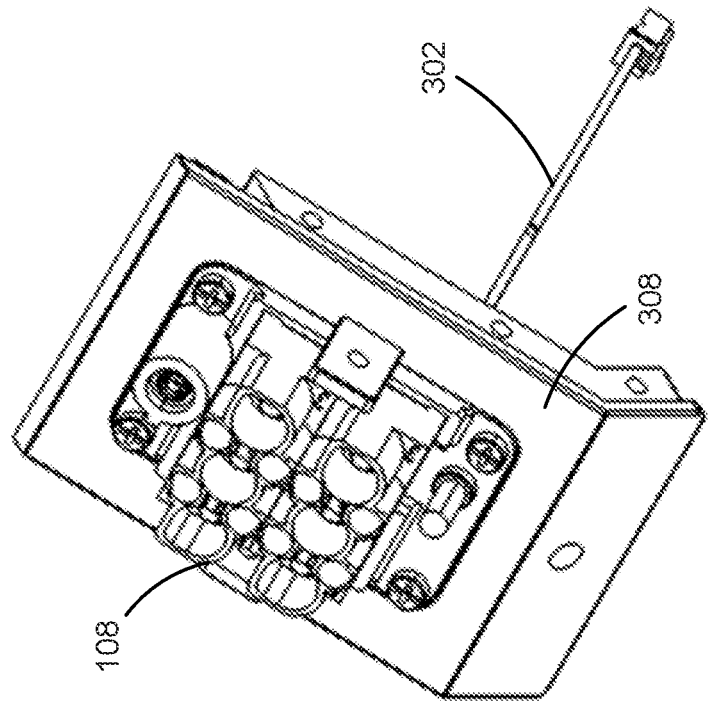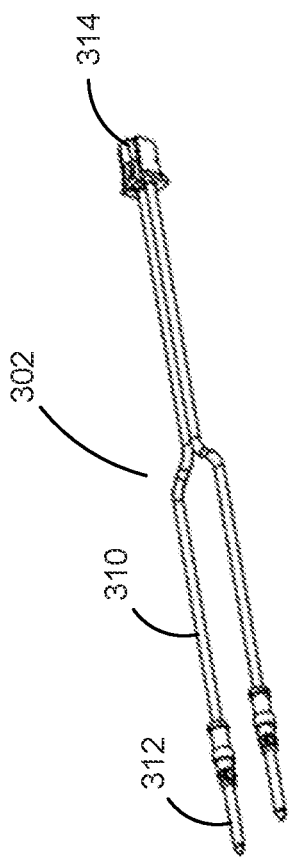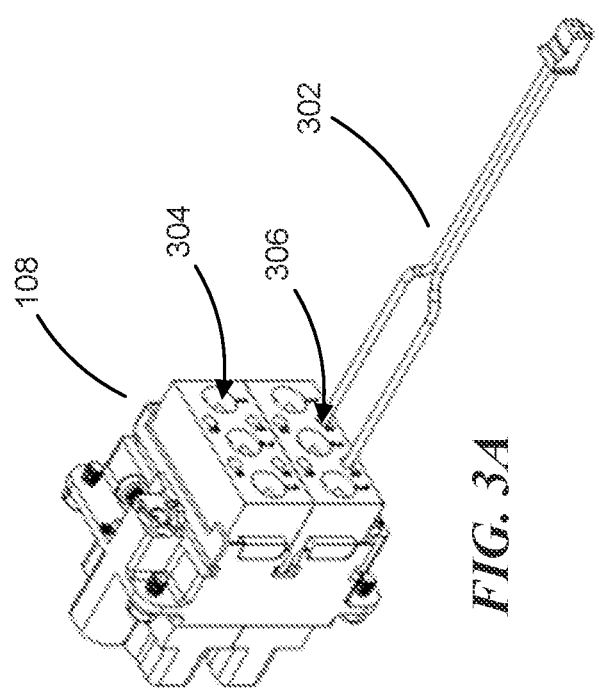
FIG. 3A
FIG. 3B
FIG. 3C

SYSTEMS AND METHODS FOR PROVIDING INPUT POWER TO A POWER DISTRIBUTION UNIT

TECHNICAL FIELD

The present disclosure is generally directed to detachable power cords for power distribution units (PDU). More specifically the disclosure is directed to detachable power cords with different input power configurations and configuring a PDU based on the input power configuration of an attached power cord.

BACKGROUND

A conventional PDU is an assembly of electrical outlets (also called receptacles) that receive electrical power from a source and distribute the electrical power to one or more separate electronic appliances. Each such PDU assembly has a power input that receives power from one or more power sources via a power cord, and power outlets that may be used to provide power to one or more electronic appliances. PDUs are used in many applications and settings such as, for example, in or on electronic equipment racks.

Generally, a PDU has a power cord that is wired into the PDU inside the PDU's housing. The power cord includes a power source connector or plug that is connectable to a facility power source, for example. Typically, the power source connector has a specific configuration corresponding to the type of power being supplied. Furthermore, a conventional PDU's power cord cannot be changed without disassembling the PDU and rewiring a new power cord, which requires an electrician. A hipot test would also need to be performed to ensure UL safety compliance. Accordingly, suppliers must provide, and customers must inventory, PDUs with different power cords depending on where in the world the PDU cabinet will be shipped and/or based on the amount of power (kW) that the particular application requires.

SUMMARY

In some aspects, the techniques described herein relate to a power distribution unit (PDU), including: a housing; one or more outlets; a power input connector; a controller; multiple power input conductors coupled to the power input connector; a pair of conductors coupled to and extending between the power input connector and the controller; and a detachable power cord, including: a power cord connector mateable with the power input connector; multiple power cord conductors coupled to the power cord connector and in electrical communication with corresponding power input conductors; and a memory coupled to the power cord connector and in electrical communication with the pair of conductors, wherein the memory includes information pertaining to the power cord.

In some aspects, the techniques described herein relate to a PDU, wherein the information pertaining to the power cord may include one or more of its name, nominal voltage, amperage capacity (i.e., current rating), minimum and maximum voltage ratings, minimum and maximum power ratings, and phase configuration.

In some aspects, the techniques described herein relate to a PDU, wherein the power cord further includes a power source connector or plug.

In some aspects, the techniques described herein relate to a PDU, wherein the information pertaining to the power cord corresponds to the power source connector.

In some aspects, the techniques described herein relate to a PDU, wherein the controller is operative to configure aspects of the PDU based on the information pertaining to the power cord.

In some aspects, the techniques described herein relate to a PDU, wherein the controller is configured to read information pertaining to the power cord from the memory.

In some aspects, the techniques described herein relate to a PDU, wherein the power cord connector includes a housing containing the memory.

In some aspects, the techniques described herein relate to a PDU, wherein the pair of conductors are signal conductors.

In some aspects, the techniques described herein relate to a power distribution unit (PDU), including: a housing; one or more outlets; a power input connector mateable with a power cord connector of a detachable power cord; a controller; and a pair of conductors coupled to and extending between the power input connector and the controller, the conductors positioned to connect with a memory housed in the power cord connector.

In some aspects, the techniques described herein relate to a PDU, wherein the controller is configured to read information pertaining to the detachable power cord from the memory.

In some aspects, the techniques described herein relate to a PDU, wherein the information pertaining to the power cord may include one or more of its name, nominal voltage, amperage capacity (i.e., current rating), minimum and maximum voltage ratings, minimum and maximum power ratings, and phase configuration.

In some aspects, the techniques described herein relate to a PDU, wherein the controller is operative to configure aspects of the PDU based on the information pertaining to the power cord.

In some aspects, the techniques described herein relate to a PDU, wherein the power cord connector includes a housing containing the memory.

In some aspects, the techniques described herein relate to a detachable power cord for use with a power distribution unit (PDU), the power cord including: a power cord connector mateable with a power input connector of the PDU; multiple power cord conductors coupled to the power cord connector for electrical connection with corresponding power input conductors of the PDU when the power cord is mated with the power input connector; and a memory coupled to the power cord connector for electrical communication with a pair of conductors of the PDU when the power cord is mated with the power input connector; wherein the memory includes information pertaining to the power cord.

In some aspects, the techniques described herein relate to a power cord, wherein the information pertaining to the power cord includes nominal voltage, amperage capacity, and phase configuration.

In some aspects, the techniques described herein relate to a power cord, wherein the power cord further includes a power source connector or plug.

In some aspects, the techniques described herein relate to a power cord, wherein the information pertaining to the power cord corresponds to the power source connector or plug.

In some aspects, the techniques described herein relate to a power cord, wherein the power cord connector includes a housing containing the memory.

In some aspects, the techniques described herein relate to a method for configuring a PDU, the method including: connecting a detachable power cord to a PDU; reading information stored on a memory associated with the detachable power cord with a controller located in the PDU; and configuring, with the controller, one or more aspects of the PDU based on the information stored on the memory.

In some aspects, the techniques described herein relate to a method, wherein the information stored on the memory includes information pertaining to the power cord including nominal voltage, amperage capacity, and phase configuration.

In some aspects, the techniques described herein relate to a method, wherein the information stored on the memory corresponds to a power source connector of the detachable power cord.

In some aspects, the techniques described herein relate to a method, wherein the detachable power cord is a first detachable power cord, and further including removing the first detachable power cord and replacing it with a second detachable power cord.

In some aspects, the techniques described herein relate to a method including, reconfiguring the PDU based on information stored on a second memory of the second detachable power cord.

The foregoing has outlined rather broadly the features and technical advantages of examples according to the disclosure in order that the detailed description that follows may be better understood. Additional features and advantages will be described hereinafter. The concepts and specific examples disclosed herein may be readily used as a basis for modifying or designing other structures for carrying out the same or similar purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present technology may be realized by reference to the following drawings. In the appended figures, similar components or features may have the same reference label.

FIG. 3A is an isometric view of the power input connector shown in FIG. 1;

FIG. 3B is an isometric view of the power input connector shown in FIGS. 1 and 3A mounted on the PDU housing;

FIG. 3C is an isometric view of the signal conductor assembly shown in FIGS. 3A and 3B;

DETAILED DESCRIPTION

This description provides examples, and is not intended to unnecessarily limit the scope, applicability or configuration of the disclosed technology. Rather, the ensuing description will provide those skilled in the art with an enabling description for implementing embodiments of the disclosed technology. Various changes may be made in the function and arrangement of elements. Thus, various embodiments may omit, substitute, and/or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Figure 1:
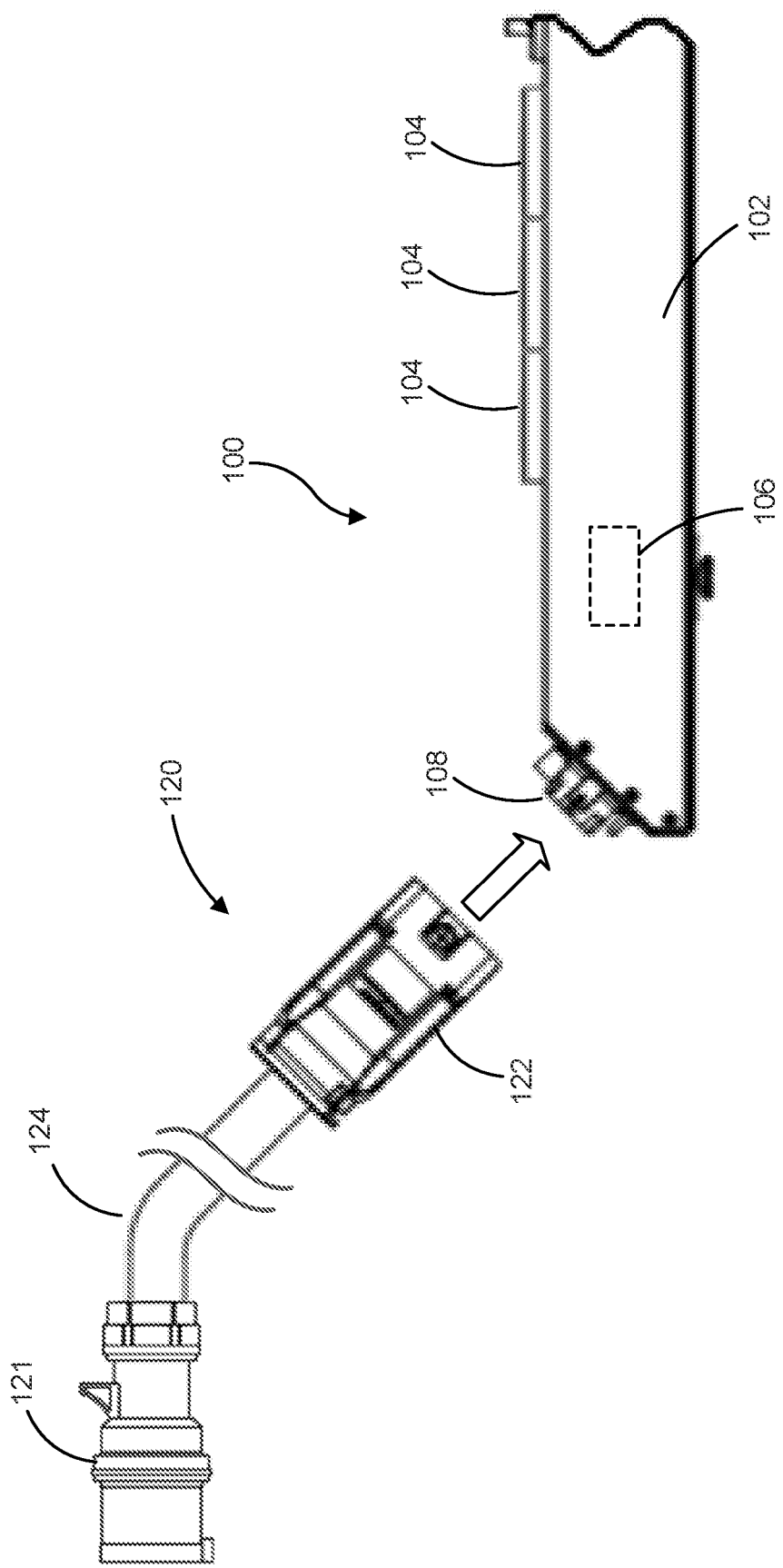
FIG. 1 is an illustration of a power distribution unit incorporating a detachable power cord configured in accordance with embodiments of the disclosed technology.

FIG. 1 is an illustration of a representative PDU 100 of an embodiment that includes various features of the present disclosure. The PDU 100 includes a PDU housing 102 having a power input connector 108 configured to mate with a power cord connector assembly 122 of a detachable power cord 120, which may be connected to an external power source (not shown). It is contemplated that the opposite (non-PDU) end of the power cord could have a connector on it to attach to the external power source or it could be wired directly to an overhead busway or a tap box that is connected to an overhead busway. This could provide a cost savings over traditional approaches, for example, by eliminating the need for an additional pin and sleeve connector on the other end and allowing for a variety of power cord lengths to accommodate differing environments. With such configurations, it is further contemplated that the ratings of the bus and/or the tap box itself, in addition to those of the PDU, could also be programmed into the power cord.

The PDU 100 according to this embodiment includes a housing 102 that is e.g., vertically mountable in an equipment rack, although it will be understood that other form factors may be used, such as a horizontally mountable housing. Multiple outlets 104 may be located at least partially within the housing 102. The PDU 100 can include a controller 106 (e.g., comprised of one or more processors and/or microcontrollers) that is operative to configure aspects of the PDU 100 based on information pertaining to the power cord 120, as explained more fully below.

The detachable power cord 120 can include a cord 124 comprising multiple power cord conductors coupled to the power cord connector assembly 122 and a power source connector 121 connectable to the external power source (not shown). The power source connector 121 corresponds to the type of power provided by the external power source. The power input to the PDU 100 can be changed by replacing the power cord 120 with a different power cord having a different power source connector. However, both power cords can have the same power cord connector 122. Thus, the same PDU can be used for many applications by replacing the power cord.

Figure 2A:
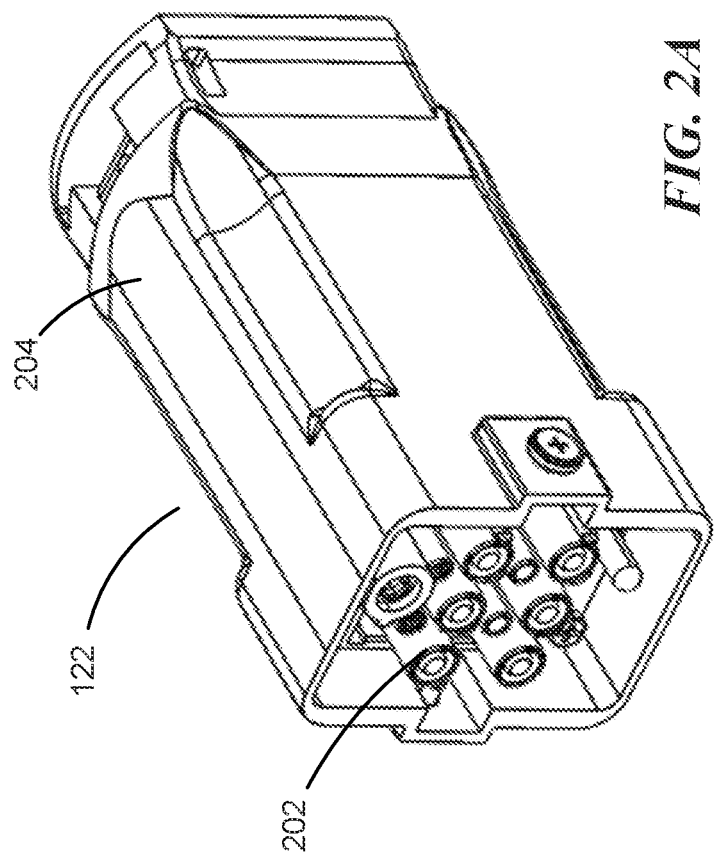
FIG. 2A is an isometric view of the power cord connector assembly shown in FIG. 1.
Figure 2B:
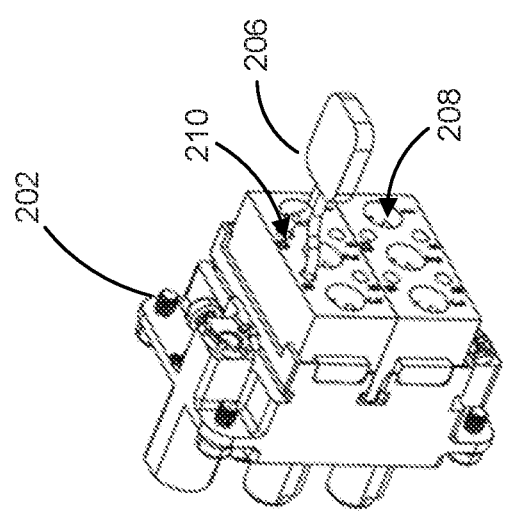
FIG. 2B is an isometric view of the power cord connector shown in FIG. 2A.
Figure 2C:
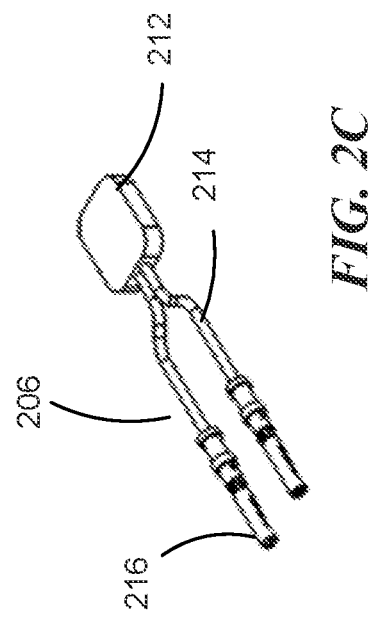
FIG. 2C is an isometric view of the memory device assembly shown in FIG. 2B.

As shown in FIGS. 2A-2C, the power cord connector assembly 122 includes a housing 204 containing a power cord connector 202 and a memory device assembly 206. The memory device assembly 206 includes information pertaining to the power cord for use by the controller 106 to configure the PDU 100 (FIG. 1). In some embodiments, the power cord connector 202 is a hybrid connector with provisions for power terminals 208 as well as signal terminals 210. With reference to FIGS. 2B and 2C the memory device assembly 206 includes a memory 212 (e.g., EEPROM) that connects to the signal terminals 210 via conductors 214 and female terminals 216. In some embodiments, the information pertaining to the power cord can include, e.g., nominal voltage, amperage capacity, and phase configuration which corresponds to the power source connector 121.

As shown in FIGS. 3A-3C, the power input connector 108 can be a hybrid connector with features that mate with the power cord connector 202. As such, power input connector 108 can include provisions for power terminals 304 as well as signal terminals 306. With reference to FIG. 3B, the power input connector 108 can be mounted in a removable panel 308 of the PDU housing 102. A signal cable 302 can connect to the signal terminals 306 via signal conductors 310 and male terminals 312. The male terminals 312 are configured and positioned in the power input connector 108 to mate with the memory device assembly 206 via female terminals 216 that are positioned in the power cord connector 202. The signal cable 302 also includes a controller connector 314 coupled to the controller 106 (FIG. 1). Thus, the signal cable 302 provides the connection between the memory 212 and the controller 106, whereby the controller 106 can read the information pertaining to the power cord 120 from the memory 212. The controller 106 can use this information to configure the PDU's input parameters and alarm thresholds stored on-board the PDU. These parameters and thresholds are then used to update a user interface (UI) via a network connection. For example, if an alarm threshold is exceeded the UI is updated to indicate an alarm. The UI can also be updated based on this information to show capacity utilization of available power through the cord (e.g., percent of available current being consumed). The artisan will appreciate that information about input parameters and input threshold alarms can be made available on a web GUI and/or locally on the PDU's local display.

Figure 4A:
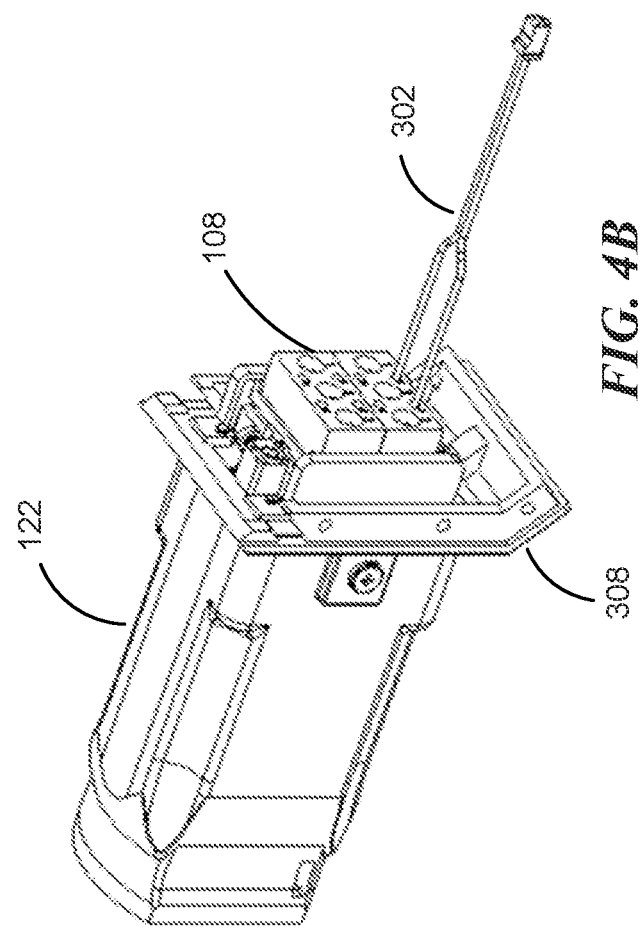
FIG. 4A is an isometric view of the power cord connector assembly of FIG. 2A mated with the input connector of FIG. 3B as viewed from the power cord side.
Figure 4A:
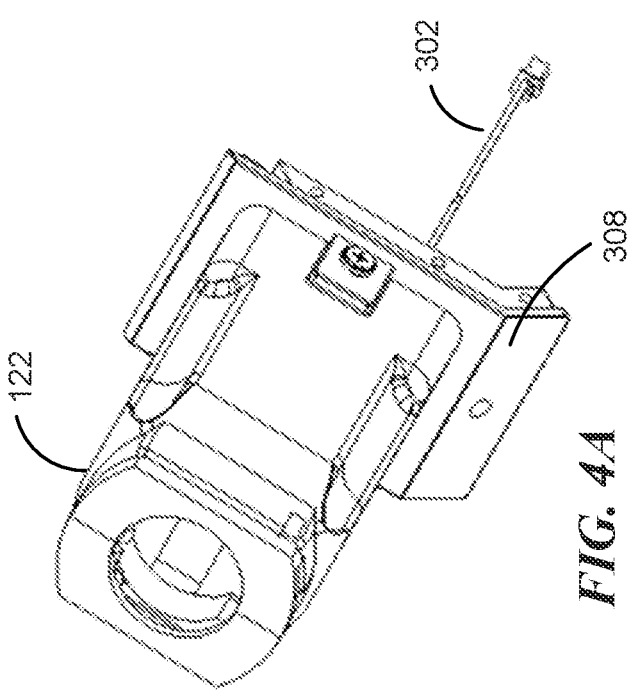
Figure 4B:
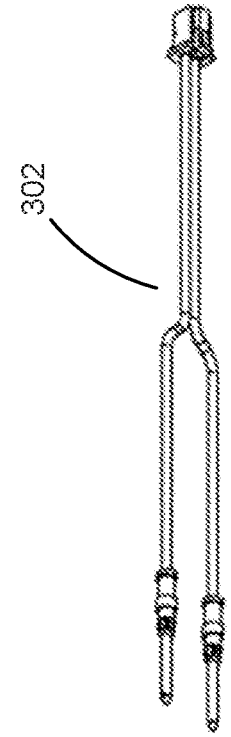
FIG. 4B is an isometric view of the power cord connector assembly of FIG. 2A mated with the input connector of FIG. 3B as viewed from the PDU side.
Figure 4C:
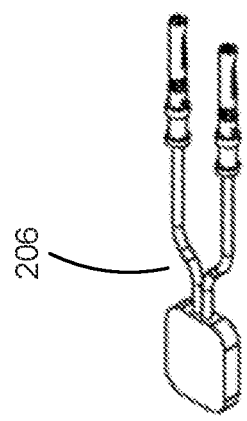
FIG. 4C is an isometric view of the memory device assembly and the signal conductor assembly as shown in FIGS. 2C and 3C, respectively.

FIGS. 4A and 4B show the power cord connector assembly 122 mated with the power input connector 108 such that the power cord conductors are coupled to and in electrical communication with corresponding power input conductors of the PDU. With reference to FIG. 4C, the terminals of the memory device assembly 206 and the signal cable 302 are also coupled to and in electrical communication with each other when the power cord connector assembly 122 is mated with the power input connector 108. While particular mating connectors (i.e., power cord connector 202 and power input connector 108) are shown and described herein, any other suitable mating connector pair, whether hybrid design or otherwise, can be used with the disclosed technology. For example, suitable connectors are commercially available from Xiamen Wain Electrical Co., Ltd.

Figure 5A:
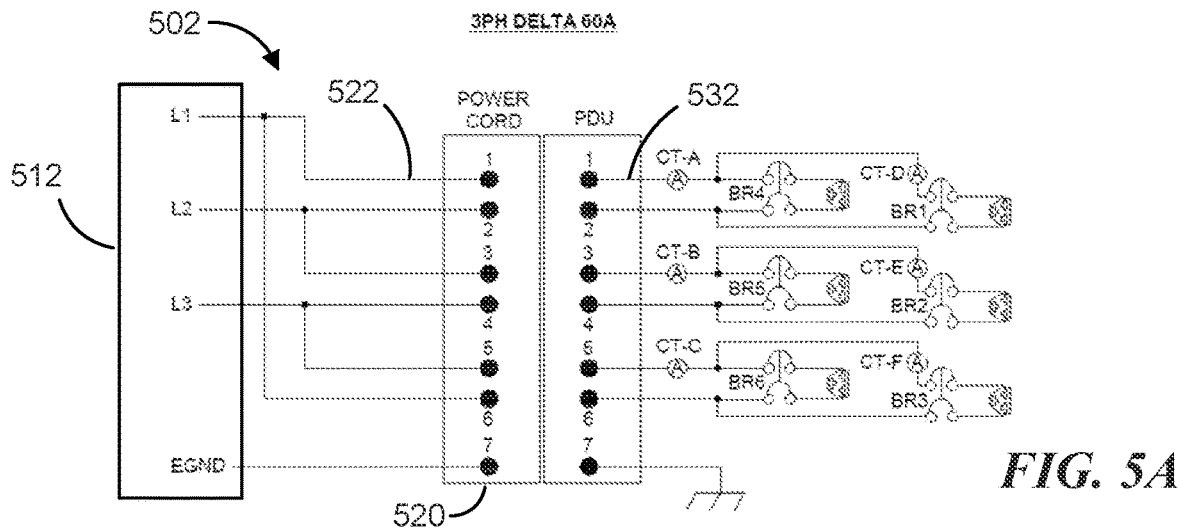
FIG. 5A is a schematic illustration of a power cord configuration according to some embodiments of the disclosed technology.
Figure 5B:
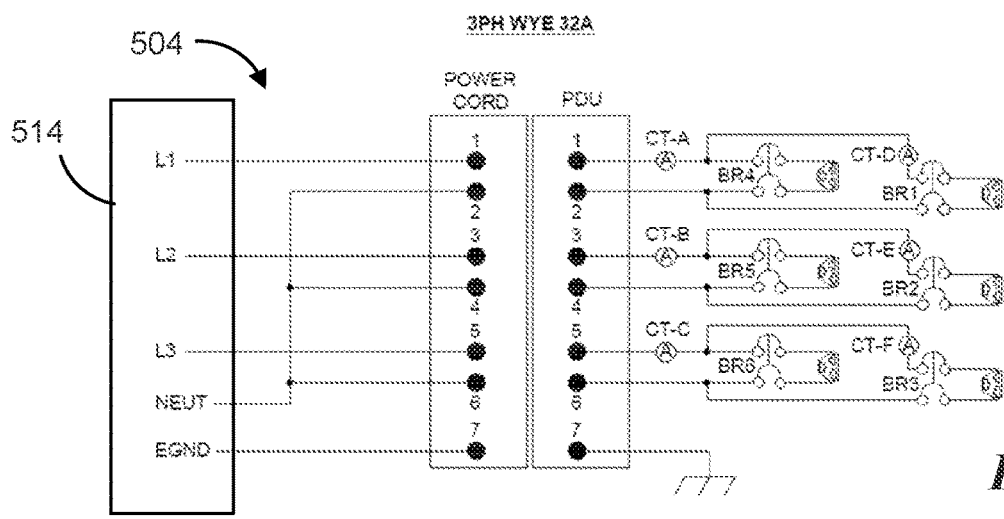
FIG. 5B is a schematic illustration of a power cord configuration according to further embodiments of the disclosed technology.
Figure 5C:
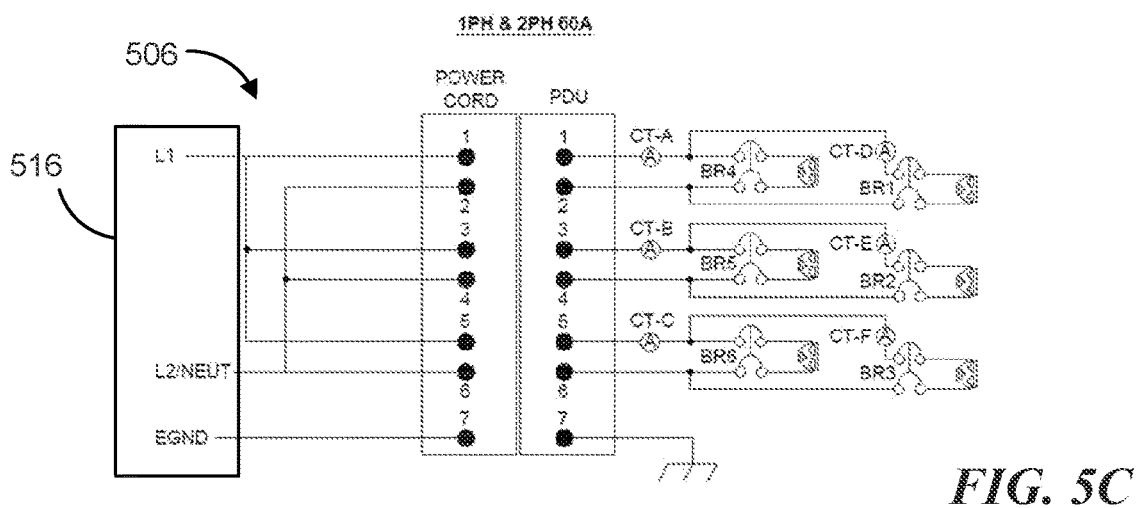
FIG. 5C is a schematic illustration of a power cord configuration according to other embodiments of the disclosed technology.

FIGS. 5A-5C are schematic illustrations of various power cord configurations 502, 504, and 506 according to some embodiments of the disclosed technology. More particularly, these figures indicate which lines of the power cord are connected to which pins of the PDU's terminal block. These figures show six connector positions (16) for the power cord connector and the PDU terminal block. Connection members on the connector shells provide a dedicated ground connection. The connections scheme shown in FIGS. 5A-5C representatively show a PDU with six branches. There are three pin sets, each associated with two of the branches. The depicted pins/branches association and wiring simplifies the design within the PDU by allowing a user to plug in a delta, wye or single phase cord into the same PDU without having to modify its internal wiring. Of course, the artisan will appreciate there could be only a single branch associated each pin set.

FIG. 5A is a 3 phase, delta configuration rated for 60 amps with a corresponding power source connector 512. FIG. 5B is a 3 phase, wye configuration rated for 32 amps with a corresponding power source connector 514. FIG. 5C is a 1 phase/2 phase configuration rated for 60 amps with a corresponding power source connector 516. As shown in FIG. 5A, for example, the power cord includes multiple power cord conductors 522 coupled to the power cord connector 520 and in electrical communication with corresponding power input conductors 532 of the PDU. The power source connectors 512, 514, and 516 can be standard connectors such as NEMA or IEC 60309 compliant connectors corresponding to the above noted configurations.

Below is a representative table showing the contents which may be stored in the EEPOM of the power cord connector. For example, in the case of inlet detection being done via an "intelligent" cable as described, the cable may include a 1-wire EEPROM which is compatible to DS2431 (1-wire family ID 0x2d), with the following content format (all multi-byte values are in little endian format), and wherein "offset" refers to an offset within the memory of the EEPROM:

| Offset | Type | Field | Comments |
| --- | --- | --- | --- |
| 0 | uint8_t | version | Needs to be the fixed value '0' |
| 1 | uint8_t | reserved | Write as '0' |
| 2 | uint8_t[6] | wiring_pins | Each of the 6 entries describes the pole connected to the respective terminal block pin: 0 = Unknown 1 = Unconnected 2 = phase L1/A 3 = phase L2/B 4 = phase L3/C 5 = neutral |
| 8 | uint16_t | current_rating | Current rating in A |
| 10 | uint16_t | min_voltage_rating | Minimum voltage rating in V |
| 12 | uint16_t | max_voltage_rating | Maximum voltage rating in V |
| 14 | uint16_t | min_power_rating | Minimum power rating in 10 VA |
| 16 | uint16_t | max_power_rating | Maximum power rating in 10 VA |
| 18 | uint8_t[32] | plug_type_name | Name of the inlet plug (zero-padded if shorter than 32 characters) |
| 50 | uint32_t | crc | CRC32 (MPEG-2 variant) over all contents |

The above table maps conductors within the power cord to positions within the PDU's terminal block. For example, for a single phase application as shown in FIG. 5C only L1 and L2 are used. Thus, values "2" and "3" would be placed into the bytes that represent each respective pair(s) of branch conductors that are connected to the associated pins on the terminal block. All other pins could have a value of "1" to indicate that they are unterminated or unconnected. The value of "0" for "unknown" may be used as a placeholder default value for all bytes on an uninitialized EEPROM, or when the PDU is capable of auto-detecting the wiring configuration based on branch voltage measurements. So, for each position on the terminal block for a properly configured power cord, there should be a value stored from "1" to "5".

Figure 6:
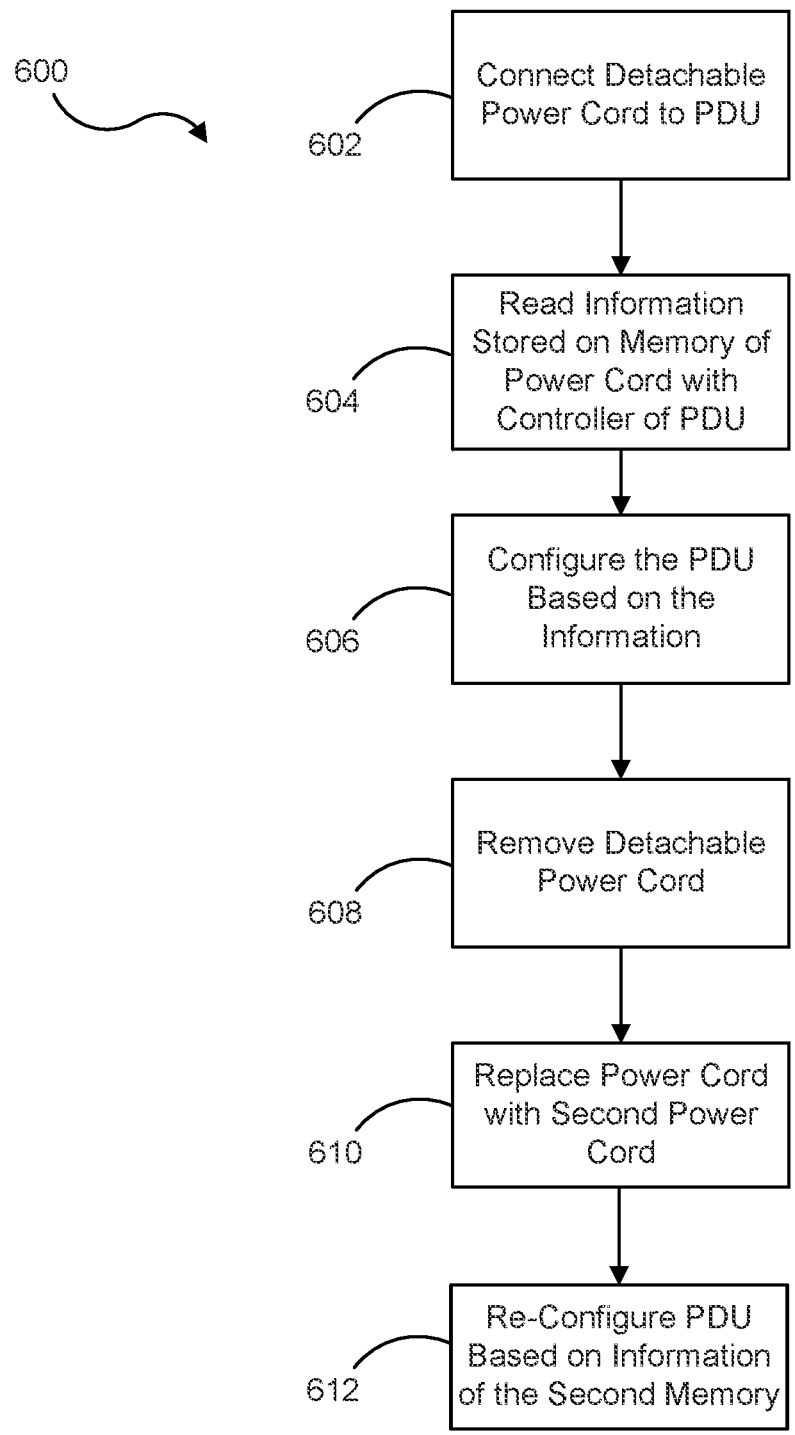
FIG. 6 is a flow diagram showing a method for configuring a PDU according to some embodiments of the disclosed technology.

FIG. 6 is a flow diagram showing a method 600 for configuring a PDU according to some embodiments of the disclosed technology. The method 600 can include connecting a detachable power cord to a PDU at step 602. At step 604, a controller located in the PDU reads information stored on a memory associated with the detachable power cord. In some embodiments, the information stored on the memory comprises information pertaining to the power cord including nominal voltage, amperage capacity, and phase configuration, for example. The information stored on the memory can also correspond to the power source connector of the detachable power cord. The method also includes configuring, with the controller, one or more aspects of the PDU based on the information stored on the memory, at step 606. The detachable power cord can be removed, at step 608, and replaced, at step 610, with a second detachable power cord different from the first. The second detachable power cord can include a second memory including information pertaining to the second power cord. Accordingly, the method can include reconfiguring the PDU based on information stored on the second memory of the second detachable power cord at step 612.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention. It will be noted that various advantages described herein are not exhaustive or exclusive, and numerous different advantages and efficiencies may be achieved, as will be recognized by one of skill in the art.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

We claim:

1. A power distribution unit (PDU), comprising:
   a housing;
   one or more outlets;
   a power input connector;
   a controller;
   multiple power input conductors coupled to the power input connector;
   a pair of conductors coupled to and extending between the power input connector and the controller; and
   a detachable power cord, comprising:
     a power cord connector mateable with the power input connector;
     multiple power cord conductors coupled to the power cord connector and in electrical communication with corresponding power input conductors; and
     a memory coupled to the power cord connector and in electrical communication with the pair of conductors, wherein the memory includes information pertaining to the power cord.

2. The PDU of claim 1, wherein the information pertaining to the power cord includes one or more of nominal voltage, amperage capacity, and phase configuration.

3. The PDU of claim 1, wherein the power cord further comprises a power source connector.

4. The PDU of claim 3, wherein the information pertaining to the power cord corresponds to the power source connector.

5. The PDU of claim 1, wherein the controller is operative to configure aspects of the PDU based on the information pertaining to the detachable power cord.

6. The PDU of claim 1, wherein the controller is configured to read information pertaining to the power cord from the memory.

7. The PDU of claim 1, wherein the power cord connector includes a housing containing the memory.

8. The PDU of claim 1, wherein the pair of conductors are signal conductors.

9. A power distribution unit (PDU), comprising:
   a housing;
   one or more outlets;
   a power input connector mateable with a power cord connector of a detachable power cord;
   a controller; and
   a pair of conductors coupled to and extending between the power input connector and the controller, the conductors positioned to connect with a memory housed in the power cord connector, wherein said controller is configured to read information pertaining to the power cord from the memory.

10. The PDU of claim 9, wherein the information pertaining to the power cord includes one or more of nominal voltage, amperage capacity, and phase configuration.

11. The PDU of claim 9, wherein the controller is operative to configure aspects of the PDU based on the information pertaining to the power cord.

12. The PDU of claim 9, wherein the power cord connector includes a housing containing the memory.

13. A detachable power cord for use with a power distribution unit (PDU), the power cord comprising:
   a power cord connector mateable with a power input connector of the PDU;
   multiple power cord conductors coupled to the power cord connector for electrical connection with corresponding power input conductors of the PDU when the power cord is mated with the power input connector; and a memory coupled to the power cord connector for electrical communication with a pair of conductors of the PDU when the power cord connector is mated with the power input connector;

wherein the memory includes information pertaining to the power cord, said information including one or more of nominal voltage, amperage capacity, and phase configuration.

14. The power cord of claim 13, wherein the power cord further comprises a power source connector.

15. The power cord of claim 14, wherein the information pertaining to the power cord corresponds to the power source connector.

16. The power cord of claim 13, wherein the power cord connector includes a housing containing the memory.

17. A method for configuring a PDU, the method comprising:

connecting a detachable power cord to a PDU;

reading information stored on a memory associated with the detachable power cord with a controller located in the PDU; and configuring, with the controller, one or more aspects of the PDU based on the information stored on the memory.

18. The method of claim 17, wherein the information stored on the memory comprises information pertaining to the power cord including one or more of nominal voltage, amperage capacity, and phase configuration.

19. The method of claim 17, wherein the information stored on the memory corresponds to a power source connector of the detachable power cord.

20. The method of claim 17, wherein the detachable power cord is a first detachable power cord, and further comprising removing the first detachable power cord and replacing it with a second detachable power cord.

21. The method of claim 20, further comprising reconfiguring the PDU based on information stored on a second memory of the second detachable power cord.

* * * * *